Nov. 19, 1929.  C. G. MUNTERS  1,736,288
REFRIGERATION
Filed Jan. 7, 1927

INVENTOR.
Carl Georg Munters
BY
his ATTORNEY

Patented Nov. 19, 1929

1,736,288

UNITED STATES PATENT OFFICE

CARL GEORG MUNTERS, OF STOCKHOLM, SWEDEN, ASSIGNOR TO ELECTROLUX SERVEL CORPORATION, OF NEW YORK, N. Y., A CORPORATION OF DELAWARE

REFRIGERATION

Application filed January 7, 1927, Serial No. 159,534, and in Sweden January 8, 1926.

The present invention relates to refrigerating apparatus of the type in which the cooling agent is caused to evaporate in the presence of an inert gas which also circulates through the evaporator of the apparatus and during its cycle passes a point having a higher temperature than that of the evaporator. In such apparatus a certain amount of heat is carried over by the circulating inert gas into the evaporator; this heat or a part thereof is given up to the cooling agent in the evaporator whereby the heat extracted by the cooling agent from its surroundings is reduced to a corresponding degree.

One manner of avoiding this objection is the use of a heat exchanger for transferring heat between the warm gas flowing into the evaporator and the cold gas mixture leaving the evaporator.

The object of the present invention is to provide another method of avoiding the abovementioned disadvantages, and consists in proportioning the circulating gas with regard to its amount, its properties and conditions of flow in relation to the surfaces where heat is taken up by or abstracted from the same so that the difference between the highest and lowest temperature of the heat absorbing surfaces (evaporator) and the heat rejecting surfaces (absorber) is at least 5° C. greater than the difference between the highest and lowest temperature of the gases.

The invention will be hereinafter explained with reference to the following description and the embodiments thereof shown in the accompanying drawings.

For a refrigerating apparatus of the above mentioned type the losses which ensue in consequence of the gas circulation per kilogram of cooling agent evaporated can be calculated in accordance with the following formula:

$$Q_f = G_f \cdot c_p \cdot (t_f - t_r)$$

in which $Q_f$ denotes the abovementioned loss; $G_f$ the amount by weight of gas circulating per kilogram of liquid ammonia; $c_p$ the specific heat of this gas at constant pressure; $t_t$ the temperature of the gas (weak gas) flowing into the evaporator, and $t_r$ the temperature of the gas mixture (rich gas) flowing out of the evaporator.

In the construction of refrigerating apparatus of the abovementioned type, it has been hitherto attempted, in order to make $Q_f$ as small as possible, to make $G_f$ as small as possible; this has been effected by making the partial pressure of the vapor of the cooling agent in the gas mixture flowing from the evaporator as equal as possible to the saturation pressure of the vapor of cooling agent at the temperature of the evaporator, that is to say, when the outflowing gas on its exit from the evaporator is saturated with vapor of the cooling agent. This, however, has the result that the apparatus must be constructed with very large evaporation surfaces in order to attain the abovementioned condition (difference greater than 5°). These large surfaces in the usual form of construction in which the gas flowing through the evaporator comes in direct contact with large unwetted surfaces causes $t_r$ in the abovementioned formula to be equal to the saturation temperature of the cooling agent, that is to say, equal to the temperature of the evaporation surfaces of the cooling agent.

On the other hand, in spite of the abovementioned efforts to reduce the amount of circulating gas $G_f$ to a lower value, this amount of gas, however, will be still further increased since the partial pressure $P_t$ of the cooling agent in the entering gas lies in the neighborhood of the partial pressure $P_r$ of the gas mixture flowing out of the evaporator. In this case the loss $Q_f$ is extraordinarily high since these partial pressures $P_t$ and $P_r$ lie close to one another. The relation is even unfavorable if the difference between the total pressure and the partial pressure of the cooling agent on its exit from the evaporator is large.

The first mentioned condition arises when attempting to obtain low evaporation temperatures since $P_r$ with falling evaporator temperature decreases so that $P_r$ and $P_t$ approach one another.

The latter condition arises with high temperatures in the condenser of the apparatus in which the cooling agent is condensed, that is, when there is a high temperature of the cooling medium, for example, with warm cooling water or with air cooling.

By the present invention the factor ($t_f - t_r$) in the abovementioned formula is limited in the manner hereinafter described which can be effected by proportioning the surfaces in relation to the amounts of cooling agent evaporating in circulating gas, and more particularly by reducing the transfer of heat between the circulating gas and the cold parts of the evaporator.

If the heat exchange between a gas and a wall is considered it shows clearly that the temperature change of the gas stands in a simple relation with the amount of surface passed over ($F$), the heat transfer factor ($k$) and the water equivalent ($ip$) of the gas passing per unit of time.

It has been found that the natural logarithm for the relation between the temperature difference between the gas and the surface at a given point and the temperature difference at another point is practically equal to the negative value of the heat transfer factor ($k$) multiplied by the surface ($F$) lying between the points considered and divided by the water equivalent ($ip$) of the gas $S_f$ passing per unit of time. This expression, can therefore, in accordance with the rule of damped oscillations preferably indicate the logarithmic decrement for the temperature change $$l_o \frac{t_2 - t_g}{t_1 - t_g} \cong - \frac{k.F}{ip.S_f}.$$

Experiments have shown that for the evaporation of the cooling agent in the inert gas corresponding rules exist. It has been found that the natural logarithm for the quotient of the pressure difference of the cooling agent $\pi 2$ and in the circulating gas $\pi 1$ at two points of the free surface is practically equal to the negative value of a factor which is proportional to the size of the evaporating surfaces lying between the said points divided by the amount of gas passing per unit of time, and further multiplied by a factor $\delta$ which gives the capacity of evaporation per unit of time per unit of surface and per unit of partial pressure difference that is, for example, $$l_o \frac{\pi 1}{\pi 2} \cong - \frac{\delta_f F}{G_f}$$

It is therefore possible in accordance with the above mentioned fact to consider this expression as the logarithmic decrement for the process of evaporation.

In a corresponding manner one can also calculate the logarithmic decrement for the absorption conditions in the absorber.

By the present invention it is obtained that the relation between the logarithmic decrement for the evaporating process (or absorption process) and the logarithmic decrement for the heating process is greater than unity and that further the logarithmic decrement for the temperature is small which can consequently be expressed that the heat transfer figure multiplied by the surface contacted by the gas and divided by the amount of gas per unit of time is less than 7.

In this manner as much cooling agent is evaporated as possible with the lowest change in the temperature of the gas. The cooling agent is also discharged therefrom with the lowest temperature change of the circulating gas.

In order, therefore, that the percentage loss should be as small as possible the physical properties of the cooling agent and the circulating gas must further be counterbalanced in a suitable manner. The deciding factors for the above mentioned conditions are:—

1. The evaporating surfaces or absorption surfaces which should be large in comparison with the surfaces contacted by the gas.
2. The capacity for evaporation per unit of surface, unit of time, and unit of pressure difference. which should be large in comparison with the heat transfer figure.
3. The heat transfer figure which should be small.
4. The surfaces contacted by the gas which should be small.
5. The circulating amount of gas which should be large.
6. The difference in temperature on entry of the gases between the gas and the evaporator which should be small.
7. The pressure differences between the saturation pressure of the cooling agent and the partial pressure of the cooling agent in the gas entering the evaporator which should be large.
8. The molecular weight of the vapor of the cooling agent which should be high.
9. The heat of vaporization of the cooling agent which should be high.
10. The total pressure in the evaporator which should be small.

As a summary of the above it can be stated that for a given gas and for a given cooling agent on the one hand the relation between the evaporating surfaces and the cold surfaces contacted by the gas is as near unity as possible, while on the other hand the gas circulation is as large as possible.

The invention will be further explained with reference to the accompanying drawings which show forms of construction of an evaporator constructed in accordance with the principles of the invention.

Figure 1:
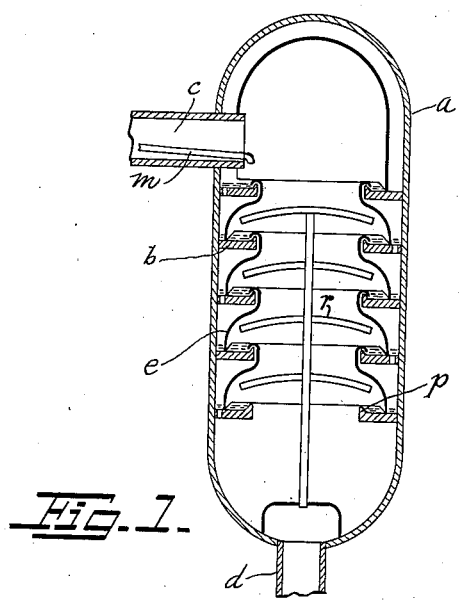
Fig. 1 shows an evaporator in section.

In Fig. 1 $a$ indicates an evaporator constructed in the form of a vertical cylindrical vessel. The evaporator may be connected to a system of apparatus as shown in United States Patent No. 1,609,334 granted December 7, 1926. In this vessel a number of horizontal discs $b$ are arranged with inner raised rims $p$ and form evaporating surfaces for the cooling agent. The pressure equalizing gas flows through the pipe $c$ into the evaporator. In using a system such as above referred to, pipe $c$ would be connected to an absorber. Liquid cooling agent is supplied to the evaporator by pipe $m$, which, in the type of system referred to, would receive the liquid cooling agent from a condenser. The resultant mixture of the equalizing gas in the evaporator with the evaporated cooling agent flows away through the pipe $d$. In using a system such as above referred to, pipe $d$ would be connected to an absorber. In order to avoid a heat transfer as far as possible from the warm gas flowing therethrough to the cooling agent by means of surfaces not covered with liquid and in conductive connection therewith, these surfaces are separated by insulation plates $e$. These insulation plates can be constructed thin so that heat transfer from these to the liquid is rendered more difficult, or constructed from a material having a low heat transfer coefficient. If they are made thin they are more easily manufactured. These plates are attached in suitable manner near the liquid surfaces or near the discs $b$ arranged in the evaporator, care being taken that this attachment is so carried out that the heat transfer to the liquid is rendered difficult. In the central portion of the evaporator a baffle device $r$ is arranged for obtaining a flow of the equalizing gas along the evaporating surfaces in order to increase the evaporation.

Figure 2:
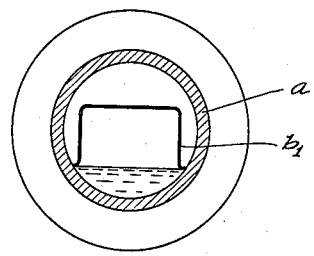
Fig. 2 shows an evaporator arranged substantially horizontally and constructed in the form of a tube

In Fig. 2 there is shown a cross section through an evaporator arranged substantially horizontally and of tubular form. The liquefied cooling agent is present at the bottom of the tube where it collects in the form of a small well by the provision of a dam arranged in the tube. The pressure equalizing gas flows above the liquid and in order to prevent heat being transferred from this gas to the cold tube wall $a$, a cover $b$ is arranged within the tube along the inside of which the gas flows, so that between this cover and the tube wall $a$ an insulating intermediate space is formed above the liquid surface.

Figure 3:
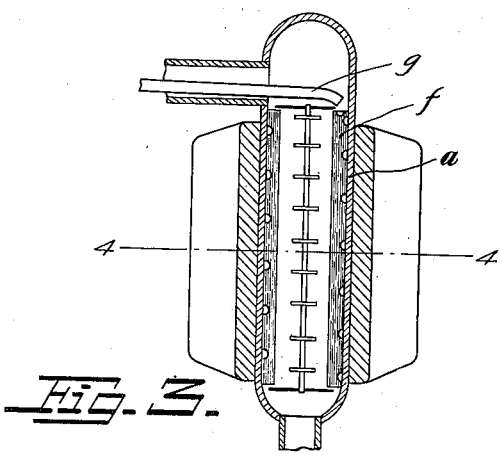
Fig. 3 shows a modified form of evaporator in longitudinal section.

In Fig. 3 an evaporator is shown in which a porous material $f$ is arranged adjacent to the shell of the evaporator $a$, which distributes the liquid cooling agent flowing through the tube $g$ and sucks it up in order to cause it to evaporate again on the inner side of the material. This material must have a good capacity for heat transfer so that the temperature drop within the same is small.

An evaporator constructed in this manner can be formed with a very small diameter.

In the figure is shown in the central part of the evaporator a baffle device $r$ which, however, is not essential.

Figure 4:
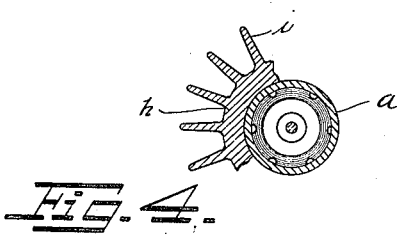
Fig. 4 is a section on the line 4—4 of Fig. 3.

In Fig. 4 is shown a cross section along the line 4—4 through the evaporator shown in Fig. 3. The evaporator vessel $a$ is surrounded by a sleeve $h$ integrally secured to the vessel which preferably is formed of aluminium or other material having a good heat transfer capacity and preferably with flanges $i$ as will be seen from the figure in order to obtain a large heat abstracting surface.

Figure 5:
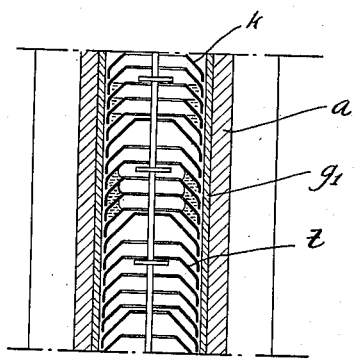
Fig. 5 shows a part of an evaporator in longitudinal section.
Figure 6:
Fig. 6 is an element arranged in the last mentioned evaporator for forming liquid containers.

In Fig. 5 is further shown a part of the evaporator according to the present invention in longitudinal section. In this evaporator baffling devices $t$ are arranged on the inner side of the wall of the evaporator body $a$ for the liquid flowing downwardly on the inner side of the wall. These baffling members consist of conical rings which are secured within the evaporator. These rings form, together with the inner wall $g_1$ of the evaporator, small liquid wells, by means of which an evaporating surface for the cooling agent is obtained. These rings are provided as shown in Fig. 6 at one place with a groove. Through this the liquid flows downwardly from one ring to the ring lying next below the same. The rings are preferably arranged so close to one another that the resultant free liquid surfaces form an angle with the horizontal plane which is shown on the left half of the figure. Some of the rings are preferably arranged somewhat higher than the others whereby rapid flow of the cooling agent through the evaporator will be prevented. It is conceivable that the evaporator can be formed as a cylindrical body on the inner side of which other baffling devices for the liquid flowing therethrough are arranged, for example, a thread formed in the wall of the evaporator or ribs, or the like provided on the wall or a wire bent to a spiral shape located within the evaporator and lying against the inside of the wall.

What relates to the construction of an evaporator can also be applied to the absorber of a refrigerating apparatus which can be constructed according to the same principle. In order to simplify the description, however, an evaporator only has been referred to, and shown.

Having now particularly described and ascertained the nature of my said invention and in what manner the same is to be performed, I declare that what I claim is:—

1. An evaporator for refrigerating apparatus comprising members forming liquid cooling agent retaining surfaces and relatively dry surfaces, means for conducting a gas through the evaporator in the presence of which the refrigerant evaporates and means for insulating the gas in its passage from the relatively dry surfaces.

2. A vessel for refrigerating apparatus comprising members forming liquid retaining surfaces and relatively dry surfaces, means for conducting a gas through the vessel and means for insulating the gas from the relatively dry surfaces.

3. An evaporator for refrigerating apparatus comprising a shell, means for holding liquid refrigerant near the shell and a passage for gas insulated from the vicinity of the shell and arranged to have communication with the space containing the liquid refrigerant.

4. An evaporator for refrigerating apparatus comprising a shell, means forming a plurality of spaces for containing liquid refrigerant in heat exchange relation with the shell and means forming a gas passage insulated from the said spaces and a plurality of restricted passages connecting said gas passage with said spaces.

5. An evaporator for refrigerating apparatus comprising a shell, a series of disks in said shell to hold liquid cooling agent in heat transfer relation with the shell and a plurality of insulation members forming a passage for gas insulated from the shell having communication with liquid on the disks.

6. An evaporator for refrigerating apparatus comprising a shell, a series of disks within said shell, means to introduce liquid cooling agent and an equalizing gas into said shell, means to distribute the liquid cooling agent over said disks and in contact with said shell, means to circulate the gas in contact with the liquid cooling agent and means to insulate the gas from said shell.

7. An evaporator for refrigerating apparatus comprising a shell, a series of disks within said shell, means to introduce liquid cooling agent and an equalizing gas into said shell, means to distribute the liquid cooling agent over said disks and in contact with said shell, means to circulate the gas in contact with the liquid cooling agent and a material of low heat conductivity insulating the gas from said shell.

In testimony whereof I affix my signature.

CARL GEORG MUNTERS.